(12) United States Patent
Foster et al.

(10) Patent No.: US 8,849,942 B1
(45) Date of Patent: Sep. 30, 2014

(54) APPLICATION PROGRAMMING INTERFACE FOR PREFETCHING MAP DATA

(75) Inventors: Andrew Foster, Naremburn (AU); Zheng Wang, Arncliffe (AU); David Hearnden, Neutral Bay (AU)

(73) Assignee: Google Inc., Mountain View, CA (US)

( * ) Notice: Subject to any disclaimer, the term of this patent is extended or adjusted under 35 U.S.C. 154(b) by 136 days.

(21) Appl. No.: 13/590,931

(22) Filed: Aug. 21, 2012

Related U.S. Application Data

(60) Provisional application No. 61/678,065, filed on Jul. 31, 2012.

(51) Int. Cl.
*G06F 15/167* (2006.01)

(52) U.S. Cl.
USPC .......................................................... 709/213

(58) Field of Classification Search
USPC .......................................................... 709/213
See application file for complete search history.

(56) References Cited

U.S. PATENT DOCUMENTS

| | | |
|---|---|---|
| 4,984,279 A | 1/1991 | Kidney et al. |
| 5,345,086 A | 9/1994 | Bertram |
| 5,793,310 A | 8/1998 | Watanabe et al. |
| 6,094,685 A | 7/2000 | Greenberg et al. |
| 6,199,150 B1 | 3/2001 | Yoshikawa |
| 6,330,453 B1 | 12/2001 | Suzuki et al. |
| 6,400,690 B1 | 6/2002 | Liu et al. |
| 6,442,757 B1 | 8/2002 | Hancock et al. |
| 6,453,233 B1 | 9/2002 | Kato |
| 6,571,279 B1 | 5/2003 | Herz et al. |
| 6,853,911 B1 | 2/2005 | Sakarya |
| 7,006,820 B1 | 2/2006 | Parker et al. |
| 7,136,748 B2 | 11/2006 | Umezu et al. |
| 7,263,368 B2 | 8/2007 | Knauerhase et al. |
| 7,315,259 B2 | 1/2008 | Sacks |
| 7,327,349 B2 | 2/2008 | Robbins et al. |

(Continued)

FOREIGN PATENT DOCUMENTS

| | | |
|---|---|---|
| KR | 10-2008-071228 | 8/2008 |
| WO | WO-98/28714 A1 | 7/1998 |
| WO | WO-2009/027161 A1 | 3/2009 |

OTHER PUBLICATIONS

Google Developers, "Google Maps API," (2012). Retrieved from the Internet on Aug. 31, 2012: URL:http://developers.google.com/maps/.

(Continued)

*Primary Examiner* — Tu Nguyen
(74) *Attorney, Agent, or Firm* — Marshall, Gerstein & Borun LLP

(57) ABSTRACT

An API for prefetching map data receives a prefetch request for an indicated geographic area from a software application. In response, the API retrieves map data corresponding to the indicated geographic area from a map data provider and stores the map data in a map data cache without causing a digital map based on the map data to be displayed on the display device. The map data cache is accessible to the software application only via the API. Subsequently to storing the map data in the map data cache, the API receives a request to render the digital map from the software application and, in response to the request to render the map image, renders the map image for display on a display device using the map data stored in the map data cache.

23 Claims, 8 Drawing Sheets

(56) References Cited

U.S. PATENT DOCUMENTS

| | | | |
|---|---|---|---|
| 7,464,109 B2 | 12/2008 | Modi | |
| 7,502,780 B2 | 3/2009 | Thorpe | |
| 7,502,876 B1 | 3/2009 | Nemirovsky et al. | |
| 7,551,182 B2 | 6/2009 | Bethune et al. | |
| 7,571,422 B2 | 8/2009 | Adel et al. | |
| 7,577,520 B2 | 8/2009 | Nomura | |
| 7,584,434 B2 | 9/2009 | Okamura | |
| 7,610,147 B2 | 10/2009 | Umezu et al. | |
| 7,663,671 B2 | 2/2010 | Gallagher et al. | |
| 7,710,421 B2 | 5/2010 | Muramatsu | |
| 7,711,473 B2 | 5/2010 | Sekine et al. | |
| 7,734,412 B2 | 6/2010 | Shi et al. | |
| 7,739,037 B2 | 6/2010 | Sumizawa et al. | |
| 7,796,837 B2 | 9/2010 | Lueck | |
| 7,831,383 B2 | 11/2010 | Oohashi | |
| 7,831,387 B2 | 11/2010 | Golding et al. | |
| 7,839,421 B2 | 11/2010 | Bethune et al. | |
| 7,873,465 B2 | 1/2011 | Geelen et al. | |
| 7,920,968 B2 | 4/2011 | Chapin et al. | |
| 7,925,624 B2 | 4/2011 | Vosshall et al. | |
| 7,925,982 B2 | 4/2011 | Parker et al. | |
| 7,962,565 B2 | 6/2011 | Coker | |
| 7,974,959 B2 | 7/2011 | Sawai et al. | |
| 7,975,025 B1 | 7/2011 | Szabo et al. | |
| 7,983,659 B2 | 7/2011 | Shinya | |
| 7,996,445 B2 | 8/2011 | Fair et al. | |
| 8,005,612 B2 | 8/2011 | Asahara et al. | |
| 8,010,407 B1 | 8/2011 | Santoro et al. | |
| 8,014,796 B2 | 9/2011 | Boudreau et al. | |
| 8,032,297 B2 | 10/2011 | Jakobson | |
| 8,060,389 B2 | 11/2011 | Johnson | |
| 8,078,641 B2 | 12/2011 | Mao et al. | |
| 8,095,307 B2 | 1/2012 | Ebert et al. | |
| 8,204,966 B1 | 6/2012 | Mendis et al. | |
| 8,280,414 B1 | 10/2012 | Nourse et al. | |
| 2002/0133491 A1 | 9/2002 | Sim et al. | |
| 2003/0187984 A1 | 10/2003 | Banavar et al. | |
| 2004/0203998 A1 | 10/2004 | Knauerhase et al. | |
| 2004/0220730 A1 | 11/2004 | Chen et al. | |
| 2006/0026170 A1 | 2/2006 | Kreitler et al. | |
| 2006/0067224 A1 | 3/2006 | Ohara | |
| 2006/0069749 A1 | 3/2006 | Herz et al. | |
| 2006/0080032 A1 | 4/2006 | Cooper et al. | |
| 2006/0195256 A1 | 8/2006 | Nakamura et al. | |
| 2006/0277271 A1 | 12/2006 | Morse et al. | |
| 2007/0050128 A1 | 3/2007 | Lee et al. | |
| 2007/0080830 A1 | 4/2007 | Sacks | |
| 2007/0143014 A1 | 6/2007 | Sekine et al. | |
| 2007/0242077 A1 | 10/2007 | Danan | |
| 2007/0273558 A1 | 11/2007 | Smith et al. | |
| 2007/0282915 A1 | 12/2007 | Vosshall et al. | |
| 2008/0071988 A1 | 3/2008 | Schloter et al. | |
| 2008/0082225 A1 | 4/2008 | Barrett | |
| 2008/0102857 A1 | 5/2008 | Kim | |
| 2008/0132249 A1 | 6/2008 | Hamilton | |
| 2008/0177469 A1 | 7/2008 | Geelen et al. | |
| 2008/0238723 A1 | 10/2008 | Fein et al. | |
| 2008/0270579 A1 | 10/2008 | Herz et al. | |
| 2008/0291205 A1 | 11/2008 | Rasmussen et al. | |
| 2009/0063042 A1 | 3/2009 | Santesson et al. | |
| 2009/0125228 A1 | 5/2009 | Dicke et al. | |
| 2009/0128483 A1 | 5/2009 | Robbins et al. | |
| 2009/0132163 A1 | 5/2009 | Ashley, Jr. et al. | |
| 2009/0153563 A1 | 6/2009 | Tudose | |
| 2009/0182500 A1 | 7/2009 | Dicke | |
| 2009/0198767 A1 | 8/2009 | Jakobson et al. | |
| 2009/0244095 A1 | 10/2009 | Bowman et al. | |
| 2009/0281718 A1 | 11/2009 | Gibran et al. | |
| 2009/0287750 A1 | 11/2009 | Banavar et al. | |
| 2009/0319177 A1 | 12/2009 | Khosravy et al. | |
| 2009/0319188 A1 | 12/2009 | Otto | |
| 2009/0326810 A1 | 12/2009 | Callaghan et al. | |
| 2010/0020091 A1 | 1/2010 | Rasmussen et al. | |
| 2010/0106397 A1 | 4/2010 | Van Essen | |
| 2010/0106801 A1 | 4/2010 | Bliss et al. | |
| 2010/0117810 A1 | 5/2010 | Hagiwara et al. | |
| 2010/0131186 A1 | 5/2010 | Geelen et al. | |
| 2010/0153007 A1 | 6/2010 | Crowley | |
| 2010/0179940 A1 | 7/2010 | Gilder et al. | |
| 2010/0250646 A1 | 9/2010 | Dunagan et al. | |
| 2010/0274899 A1 | 10/2010 | Shrivastava et al. | |
| 2010/0321399 A1 | 12/2010 | Ellren et al. | |
| 2010/0333085 A1 | 12/2010 | Criddle et al. | |
| 2011/0054776 A1 | 3/2011 | Petrov et al. | |
| 2011/0093515 A1 | 4/2011 | Albanese | |
| 2011/0095993 A1 | 4/2011 | Zuverink | |
| 2011/0098917 A1 | 4/2011 | LeBeau et al. | |
| 2011/0098918 A1 | 4/2011 | Siliski et al. | |
| 2011/0161875 A1 | 6/2011 | Kankainen | |
| 2011/0213798 A1 | 9/2011 | Osuka et al. | |
| 2011/0276263 A1 | 11/2011 | Shimotani et al. | |
| 2011/0300848 A1 | 12/2011 | Boudreau et al. | |
| 2011/0316854 A1 | 12/2011 | Vandrovec | |
| 2012/0022786 A1 | 1/2012 | Siliski et al. | |
| 2012/0022787 A1 | 1/2012 | LeBeau et al. | |
| 2012/0083995 A1 | 4/2012 | Vorona | |
| 2013/0151645 A1 * | 6/2013 | Siliski et al. | 709/213 |

OTHER PUBLICATIONS

Mapquest, "JavaScript Maps API," (2012). Retrieved from the Internet on Aug. 31, 2012: URL:http://developer.mapquest.com/web/products/featured/javascript.

MSDN, "Get Started Using Bing Maps," (2012). Retrieved from the Internet on Aug. 31, 2012: URL:http://msdn.microsoft.com/en-us/library/dd877180.aspx.

Wiki, "API," (2012). Retrieved from the Internet on Aug. 31, 2012: URL:http://wiki.openstreetmap.org/wiki/API.

International Search Report and Written Opinion for Application No. PCT/US2012/051574, dated Feb. 15, 2013.

International Search Report and Written Opinion for Application No. PCT/US2012/051577, dated Feb. 15, 2013.

International Search Report and Written Opinion for Application No. PCT/US2012/065002, dated Mar. 29, 2013.

International Search Report and Written Opinion for Application No. PCT/US2012/065008, dated Mar. 29, 2013.

International Search Report for Application No. PCT/US2012/051564, dated Feb. 18, 2013.

Kirchner et al. "A Location-aware Prefetchting Mechanism," Project work at Distributed Information Systems Laboratory LSIR (2004).

Molina, "Aiming and Guiding Navigation with a Non-visual GPS Application," Department of Design Sciences Faculty of Engineering, Lund University (2010).

Office action for U.S. Appl. No. 13/244,717, dated Nov. 15, 2011.

Office action for U.S. Appl. No. 13/244,764, dated Nov. 28, 2011.

Piras et al., "Compact GML: merging mobile computing and mobile cartography," CRS4, Center for Advanced Studies, Research and Development in Sardinia (2004).

Reichenbacher et al., "The World in Your Pocket—Towards a Mobile Cartography," Proc. of the 20th International Cartographic Conference (2001).

Weber, "Mobile Map Browsers: Anticipated User Interaction for Data Pre-Fetching," Thesis, The University of Maine, (2010).

* cited by examiner

APPLICATION PROGRAMMING INTERFACE FOR PREFETCHING MAP DATA

CROSS-REFERENCE TO RELATED APPLICATION

This application claims priority to U.S. Provisional Patent Application No. 61/678,065, filed on Jul. 31, 2012, and entitled "Application Programming Interface for Prefetching Map Data," the entire disclosure of which is hereby expressly incorporated by reference herein.

FIELD OF THE DISCLOSURE

The present disclosure relates to digital maps and, more particularly, to an application programming interface (API) for prefetching map data on a computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, various computing devices, including many portable devices, support software applications that display interactive digital maps. Some of these software applications, such as mapping and navigation applications, are developed primarily for displaying interactive digital maps. Other software applications, such as web browsers, may display interactive digital maps along with other content.

To display an interactive digital map, a software application usually requests map data from a map data provider for a particular geographic area. A software application executing on a portable device (such as a smart phone) typically requests map data from the map data provider via a wireless communication network in which the portable device operates. As a result, the software application can only receive map data when the portable device has wireless network coverage that supports a data connection. When the portable device cannot establish a data connection, or when the portable device leaves the area of network coverage altogether, the software application often cannot display a map of the area in which the portable device is located, for example.

SUMMARY

One embodiment of the techniques discussed below is a computer-readable medium storing instructions that implement an API for prefetching map data. The map data is prefetched on a computing device having a processor and a display device and configured to communicate with a map data provider via a communication network. When invoked in a software application executed on the processor, the API is configured to receive a prefetch request for an indicated geographic area from the software application. In response to the prefetch request, the API is configured to retrieve map data corresponding to the indicated geographic area from the map data provider and store the map data in a map data cache without causing a map image based on the map data to be displayed on the display device, where the map data cache is accessible to the software application only via the API. The API is further configured to, subsequently to storing the map data in the map data cache, receive a request to render the map image from the software application and, in response to the request to render the map image, render the map image using the map data stored in the map data cache, where the map image is displayed on the display device.

Another embodiment of these techniques is a method for prefetching map data in computing device including a memory, a processor, and a display device. The method includes allocating a portion of the memory for use as a map data cache that stores map data received from a map data provider via a communication network, and preventing software applications being executed by the processor from accessing the map data cache. The method further includes providing an API for use by the software applications. In response to the API being invoked for prefetching map data, the method includes retrieving map data for an indicated geographic area and storing the map data in the map data cache, where a map image based on the map data is not displayed on the display device in response to the API being invoked for prefetching the map data. In response to the API subsequently being invoked for displaying the prefetched map data, the method includes retrieving the map data from the map data cache and generating a map image using the map data for display on the display device.

According to yet another embodiment, a mobile device is configured to communicate via a wireless communication link and includes a processor, a display device, a network interface communicatively coupled to the wireless communication link, a memory communicatively coupled to the processor, a map data cache disposed in the memory, and instructions stored in the memory that implement an API for prefetching map data. The map data cache is not accessible to software applications executing on the mobile device via read or write operations. The API, when invoked by a software application executing on the mobile device, is configured to, in response to receiving a prefetch request indicating a geographic area from a software application executing on the mobile device, retrieve map data for the indicated geographic area via the network interface and store the map data in the map data cache, where a map image based on the map data is not displayed on the display device in response to receiving the prefetch request. In response to subsequently receiving a request to render the map image from the software application, the API is configured to cause the map image to be displayed on the display device using the map data stored in the map data cache.

DETAILED DESCRIPTION

An Application Programming Interface (API) allows software applications to prefetch map data for a geographic area in advance of a user request or an automated decision to display a digital map image (for simplicity, a "digital map") of the geographic area. According to an example implementation, a software application invokes the API to specify a polyline or a point, and the API retrieves map data for a geographic area within a certain radius of the polyline or point from a map data provider. The API stores the received map data in a map data cache over which the API has exclusive control, so that a software application that invokes the API cannot access the map data cache directly. In other words, the software application can access the map data cache only via calls to the API. Further, the API may control the level of detail of the prefetched map data. At a later time, the software application invokes the API to display a digital map of the geographic area, and the API renders the digital map using the stored map data without requesting the map data from the map data provider.

Figure 1:
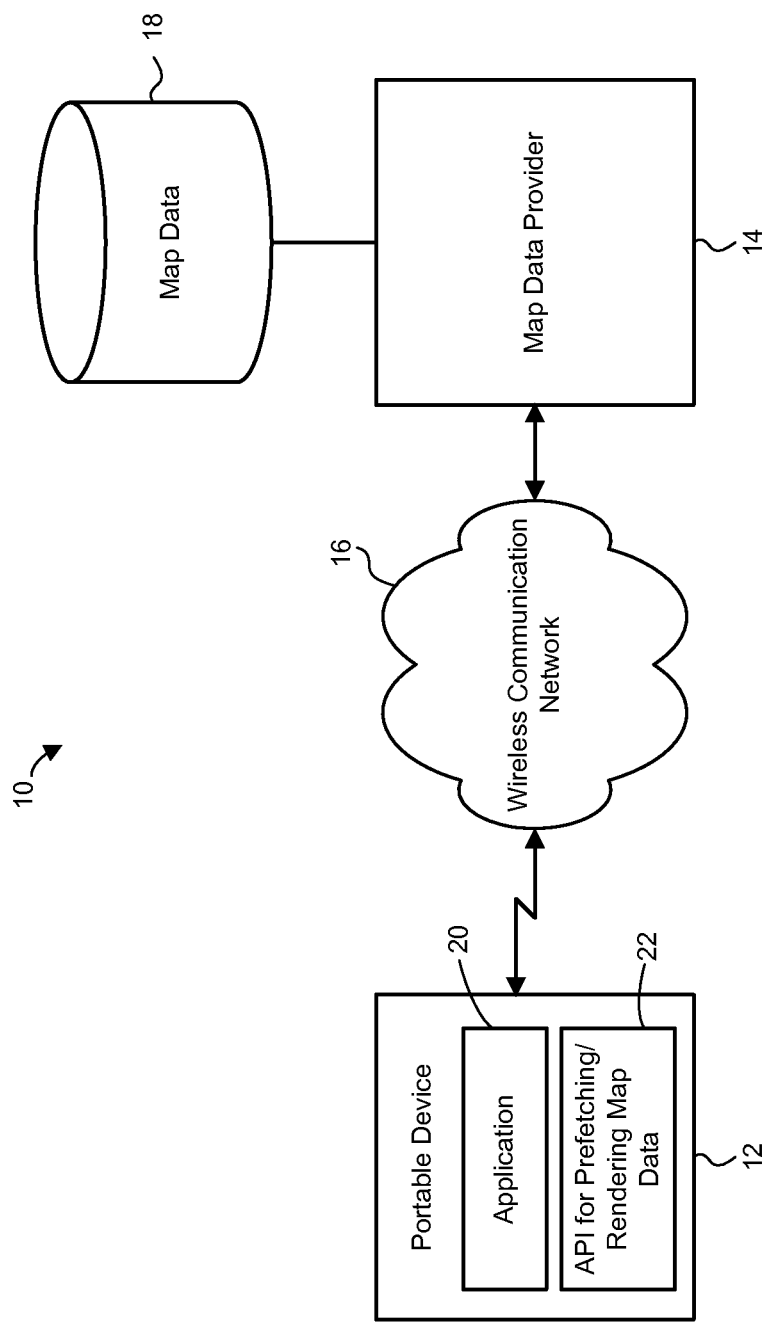
FIG. 1 is a block diagram of an example communication system in which a software application executing on a portable device invokes an API to prefetch map data from a map data provider.

FIG. 1 illustrates an example communication system 10 in which a portable device 12 receives map data from a map data provider 14 via a wireless communication network 16. The map data provider 14 in this implementation is a server that communicates with a map database 18. A software application 20 may invoke an API 22 for prefetching and rendering map data in anticipation of losing network coverage, or when the cost of a network connection is expected to rise, for example. More generally, the software application 20 may prefetch map data using the API 22 when there is a significant probability (or certainty) that the map data will be needed at the portable device 12 at a later time, and when the present conditions for receiving data are better than the expected conditions at the later time.

When the portable device 12 operates in the wireless communication network 16, the software application 20 requests and receives map data from the map data provider 14 on demand. For example, the software application 20 may be a mapping application, and a user may request a digital map for a specified location (e.g., "San Francisco, Calif."). The software application 20 generates and transmits a request for map data corresponding to the specified location upon receiving the user request. The map data server 14 in response provides the requested map data, and the software application 20 renders and displays a digital map for the specified location. As another example, the software application 20 may be a navigation application configured to display a digital map for the current location of the portable device 12. When the portable device 12 enters a location for which map data is not yet available, the software application 20 automatically generates a request for map data corresponding to this new location.

However, the software application 20 (or, in some cases, the user) may determine that the portable device 12 will soon leave the area of coverage of the wireless communication network 16, or that the portable device 12 will roam to a wireless network that offers a significantly slower or a significantly more expensive data connection. If the software application 20 or the user can anticipate for which locations map data will be needed, the software application 20 can invoke the API 22 to prefetch map data for some of all of these anticipated locations. In some embodiments, the software application 20 is configured to automatically prefetch map data only if the user explicitly configures the software application 20 to do so, particularly if the software application 20 uses the user's profile to determine which map data should be prefetched. In other embodiments, the software application 20 automatically prefetches map data without the user's explicit configuration, but in any case with user's consent and in accordance with relevant privacy policies.

Generally speaking, the software application 20 may respond to various events or "signals" to determine that map data should be prefetched, and identify the geographic area for which map data should be prefetched. For example, the user may search for driving directions, and the software application 20 may anticipate loss of network coverage along the route from a source location to the destination. If the user configured her user profile so as to allow the software application 20 to prefetch based on driving directions, the software application 20 invokes the API 22 to prefetch map data along the entire route or parts of the route. As another example, the user may configure his user profile so as to cause the software application 20 to unconditionally prefetch map data along a route, regardless of whether the portable device 12 is expected to have network coverage.

With continued reference to FIG. 1, the wireless communication network 16 may be a cellular network, a wireless local area network (WLAN) network, or any other suitable network that provides a data connection to the portable device 12. The map server 14 need not be coupled to the wireless communication network 16 directly. Thus, in some implementations, the map server 14 operates on a wide area network such as the Internet that is communicatively coupled to the wireless communication network 16 via a gateway, for example. In general, the map server 14 may be a single computing device having a memory and a processor that executes instructions stored in the memory, a pool of such devices (each capable of processing a request for map data), a group of such devices that processes requests for map data in a distributed manner, etc. The map database 18 similarly may be implemented in any suitable manner on one or multiple physical devices.

The portable device 12 can be a laptop or tablet computer, a smart phone, a car navigation system, a hand-held global positioning system (GPS) unit, or any other suitable device. An example embodiment of a portable device that can operate in the communication system 10 is discussed next with reference to FIG. 2.

Figure 2:
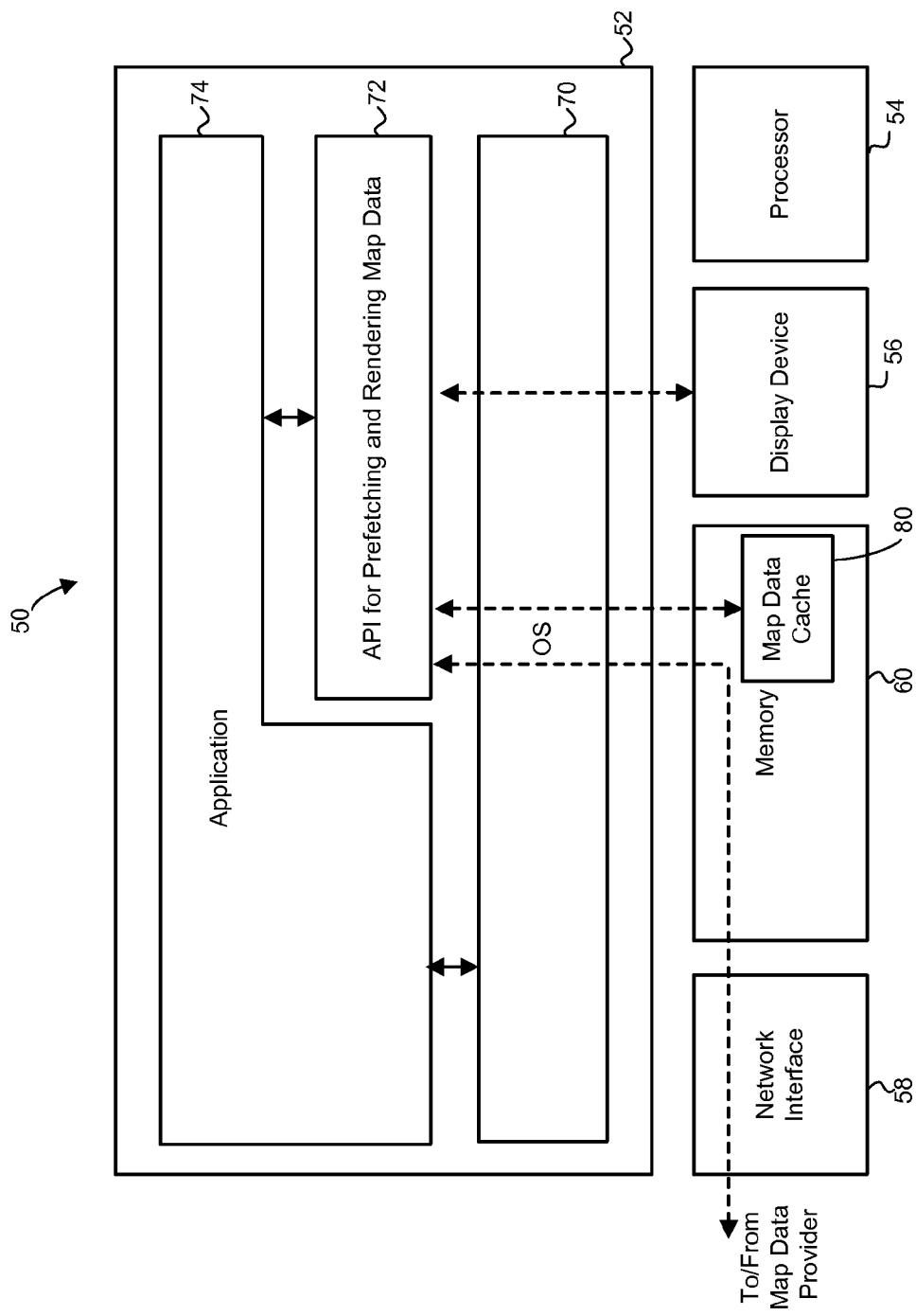
FIG. 2 is a block diagram of an example portable device of FIG. 1.

An example portable device 50 illustrated in FIG. 2 includes an instruction memory 52, a processor 54 configured to execute instructions stored in the memory 52, a display device 56, a network interface 58 that supports wireless communications, and a storage memory 60. For clarity, the instruction memory 52 and the storage memory 60 are illustrated separately. It will be understood, however, that the components 52 and 60 also can be regions within the same memory module. More generally, the portable device 50 can include one or several additional processors, memory modules, network interfaces, which may be provided separately or on a same chip or board. Further, the components 52 and 60 may include persistent memory (e.g., flash memory), volatile memory (e.g., RAM), or both.

The instruction memory 52 stores sets of instructions of an operating system (OS) 70, an API for prefetching and rendering map data 72, and a software application 74. The OS 70 may be a mobile OS developed specifically for portable devices. As such, the OS 70 may include functions that allow the software application to access such data as wireless network parameters (e.g., identity of the wireless network, quality of service), as well as invoke such services as telephony, location determination (e.g., via global positioning service (GPS) or WLAN), wireless network data call origination, etc. In another implementation, the OS 70 is a general-purpose operating system that operates on both mobile and stationary devices, such as smartphones and desktop computers, for example.

Similar to the API 22 discussed above, the API for prefeteching and rendering map data 72 allows software applications to prefetch map data along a polyline, a point, an arc, etc., or within a shape that encloses a geographic area such as a polygon, a circle, a rectangle, etc., or according to another suitable principle. The API 72 in one scenario receives a specification of a polyline as a set of points interconnected by straight line segments. For example, the software application 74 may generate or receive driving directions in the form of endpoints and intermediate points (e.g., Source=starting address at 1010 Fifth, P1=Fifth at Main, P2=Main and Third, etc.) and provide these endpoints to the API 72 as a parameter to prefetch map data along the corresponding polyline. In another scenario, the software application 74 specifies only the endpoints (e.g., Source=1010 Fifth, Destination=2020 Third), and the API 72 automatically requests map data along the polyline that forms the route between the points S and E from the map data provider.

The API 72 in one embodiment is provided as a part of a "larger" API for retrieving map data. For example, the API 72 may be a component of an API for obtaining map data, business data, driving directions, etc. from a map data provider. The API 72 also may share some of the interface exposed to software applications with the larger API. In particular, the larger API may include a function which the software application 74 invokes to retrieve map data on demand, such that an additional parameter supplied to the function indicates that the software application 74 invokes the API 72 to prefetch map data in advance of an event that triggers the display of the map data. Thus, the API 72 in general can support fetching as well as prefetching of map data, and the software application 74 can select between fetching and prefetching via special parameters, different function calls, or in any other suitable manner.

The API 72 can be implemented as one or several functions, a data structure, a messaging scheme, etc. Further, the API 72 may include compiled code that executes directly on the processor 54 or, alternatively, instructions in a any other form such as a scripting language interpreted at runtime by the application 74. The API 72 in one example includes well-documented prototypes of several functions which a developer can include in the code of the software application 74, as well as instructions that implement these functions. If desired, the implementation instructions can be provided in a binary format unreadable by the developer.

In some cases, the API 72 is provided as a part of the OS 70. In one such implementation, the software application 74 is "native" to the OS 70, i.e., the software application 74 is developed to execute specifically on the OS 70 using the function library supported by the OS 70, including using the functions that are unique to the OS 70. The API 72 alternatively can be developed as a separate module compatible with the OS 70. Also, the software application 74 in other implementations can operate on a variety of platforms, and can operate on the OS 70 using the corresponding porting instructions.

The software application 74 can be, for example, a mapping application, a navigation application, a shopping guide application, etc. Further, the software application 74 can be a web browser application that invokes the API 72 to display map within an allocated portion of a browser window. In general, the API 72 can be made available to any suitable software application that executes on the portable device 50. Also, multiple different software applications may invoke the API 72.

Referring still to FIG. 2, the software application 74 invokes the API 72 with a prefetch request indicating a certain geographic area, and the API 72 retrieves and stores prefetched map data in a map data cache 80. At a later time, the software application 74 invokes the API 72 again to render a digital map corresponding to the same geographic area or a portion of that area. The API 72 checks the map data cache 80 to see whether the requested map data is already available on the portable device 50 and, if so, retrieves the map data from the map data cache 80. The API 72 then can render a digital map using the stored map data. In some implementations, the API 72 is configured to also display the rendered digital map on the display device 56. The API 72 may control the level of detail of the prefetched map data and, in some cases, the zoom level of the prefetched map data. For example, the software application 74 may request that map data be prefetched along a specified polyline, and the API 72 in response may prefetch a base map with the zoom at which roads are visible but individual buildings and other structures are not visible. As another example, the API 72 may prefetch map data that embeds various markers and point of interest (POI) information. In this manner, the API 72 may effectively limit the use of prefetched map data by the software application 74.

The OS 70 and/or the API 72 may allocate a portion of the memory 60 for use as the map data cache 80 when the API 72 is initialized or when the portable device 50 powers up, for example. In at least some of the implementations, the software application 74 cannot directly access the map data cache 80. Thus, even though the software application 74 in general can invoke standard functions for writing and reading data to and from the memory 60, the map data cache 80 is inaccessible to the software application 74 other than via the API 72. To this end, the OS 70 may control access to the map data cache 80 at the level of read and write operations, so that the software application 74 cannot inadvertently or purposefully refer to memory locations within the map data cache 80. In another implementation, the API 72 allocates memory for map data cache 80 without exposing the location of the map data cache 80 to the software application 74 but also without any additional protection from the OS 70. In yet another implementation, the map data cache 80 stores map data in an encoded format which the software application 74 cannot interpret.

The map data cache 80 need not be limited to prefetched map data and, according to some implementations, stores all map data received from a map data provider. The API 72 may be configured to both save map data to the map data cache and remove map data from the map data cache when necessary. For example, the API 72 may be configured to remove those portions of the map data that are no longer current. As another example, the API 72 may remove the oldest map data once the entire map data cache 80 is occupied.

The map data in the map data cache 80 can correspond to various types of geographic data including topographical data, street data, urban transit information, and traffic data. The geographic data in turn may be schematic or based on photography, such as satellite imagery. Further, the map data can be for rendering a digital map in two-dimensional (2D) or three-dimensional (3D) format.

The map data can conform to any suitable format including a raster format and a vector graphics format, for example.

Generally speaking, an image in a raster format specifies which colors are applied to various pixels that make up an image, whereas a graphic in a vector graphics format includes mathematical descriptions of points and various shapes (e.g., a line can be specified using a vector graphics format as two endpoints and an indication of thickness and color). In the scenarios in which the map data cache 80 stores map data in a raster format, the map data may be organized into regular sized component images, or "tiles" corresponding to a certain zoom level. For example, at a particular zoom level, a map tile can be a square 128 pixels wide that in the physical world corresponds to a square geographic area that is two hundred meters wide. In another scenario in which the map data cache 80 stores map data in a vector graphics format, the shapes that make up a digital map are organized according to square map tiles for convenience. In yet another scenario, the shapes stored in the map data cache 80 are not organized into tiles at all.

In some implementations, in addition to data used to render a digital map, the map data in the map data cache 80 includes other information associated with geographic coordinates. For example, the API 72 can retrieve business data such as names, hours of operation, customer reviews, etc. for businesses located within a radius of a polyline, a point, within an enclosed polygon, etc.

To better illustrate which map data that can be stored in the map data cache 80, several example approaches are discussed next with reference to FIGS. 3-7. The API 22, the API 72, or another suitable API configured to prefetch map data can implement these techniques in the corresponding portable or non-portable device. However, for ease of explanation, the examples of FIGS. 3-7 are discussed with reference to the API 72.

Figure 3:
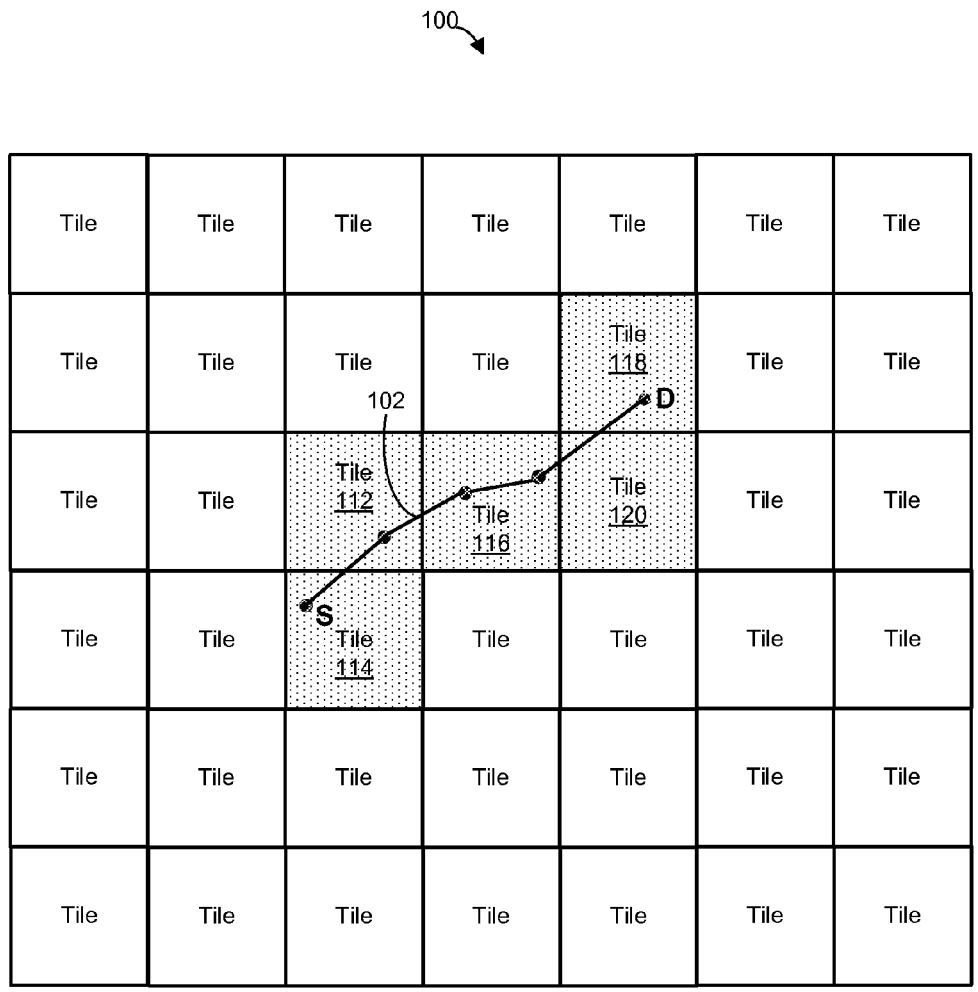
FIG. 3 is a diagram that illustrates prefetching map tiles through which a polyline, supplied to the API of FIG. 1 as a parameter, passes.

Referring first to FIG. 3, a map tile array 100 includes multiple square map tiles that make up a digital map of a certain large geographic area at a relatively low zoom level, which can be preprogrammed in the API 72 or supplied to the API 72 as a parameter. The API 72 prefetches map data along a polyline 102 between a source S and a destination D. Because the polyline 102 passes through map tiles 112-120, the API 72 in this implementation prefetches only these map tiles, and does not prefetch the surrounding map tiles (illustrated without shading in FIG. 3).

Figure 4:
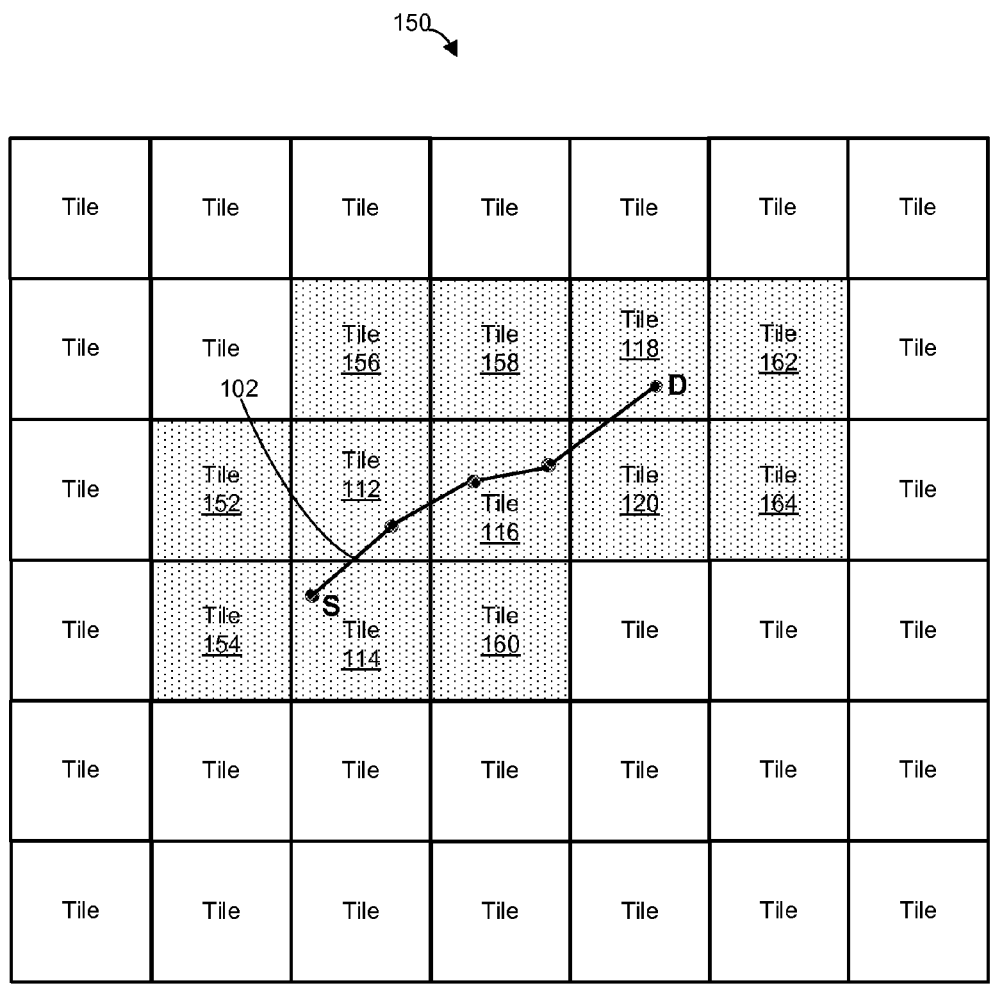
FIG. 4 is a diagram that illustrates prefetching map tiles within a certain radius of the polyline of FIG. 3.

In another scenario illustrated in FIG. 4, the API 72 is configured to prefetch map tiles within a certain radius of the polyline 102. The radius as well as the zoom level can be preprogrammed, or the API 72 can receive the radius and the zoom level as parameters. The API 72 in this example prefetches, in addition to map tiles 112-120, map tiles 152-164.

Figure 5:
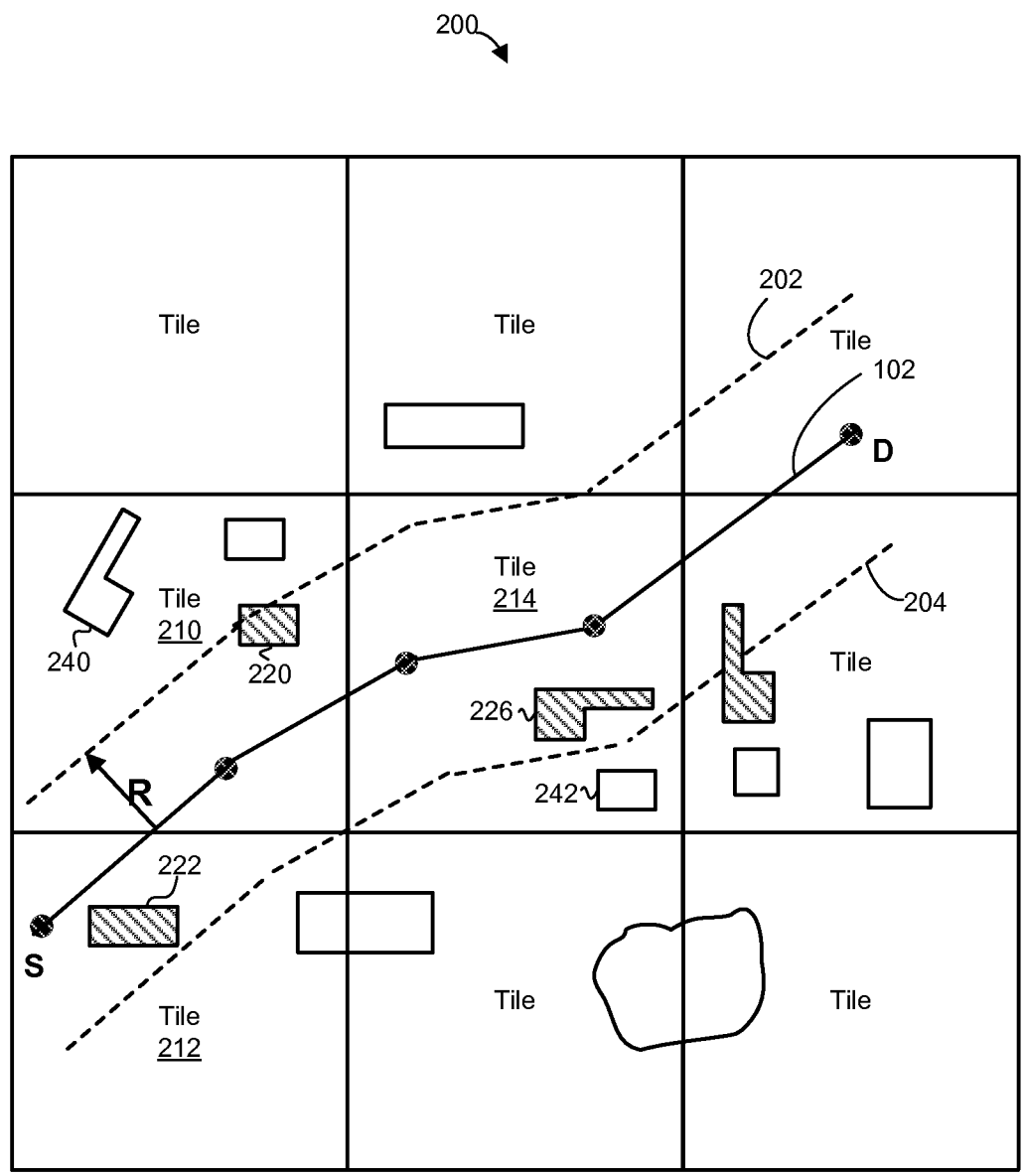
FIG. 5 is a diagram that illustrates prefetching map elements in a vector format within a certain radius of a polyline supplied to the API of FIG. 1 as a parameter.

As one alternative to the approaches illustrated in FIGS. 3 and 4, the API 72 can efficiently prefetch map elements corresponding to physical entities (e.g., buildings, parks, bodies of water) that lie within a certain radius of a polyline or a point, and not necessarily prefetch entire map tiles that include these map elements. For example, FIG. 5 illustrates prefetching map elements in a vector format within a certain radius of a polyline 102. The virtual lines 202 and 204 demarcate the boundaries of the geographic area for which the API 72 prefetches map data. Each of lines 202 and 204 is at a distance R of the polyline 102. Although the polyline 102 in this example passes through map tiles 210 and 214, the API 72 prefetches only map elements 220, 222, 226, etc. that are at least partially located within the area bounded by the virtual lines 202 and 204. By contrast, the API 72 does not prefetch map elements 240 or 242, for example. Map elements that the API 72 prefetches are illustrated with a fill pattern, and map elements that the API 72 does not prefetch are illustrated without a fill pattern.

Figure 6:
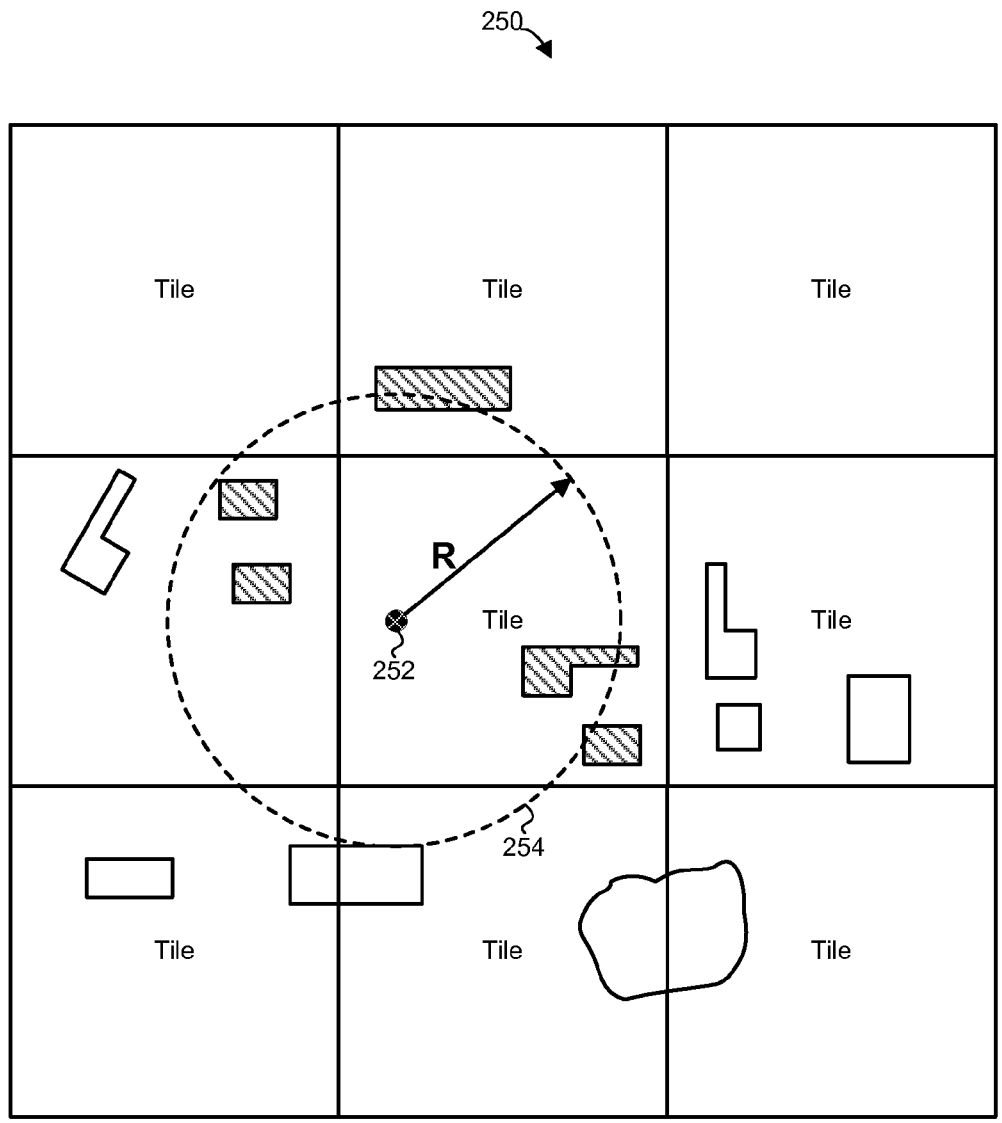
FIG. 6 schematically illustrates prefetching map elements in a vector format within a certain radius of a point supplied to the API of FIG. 1 as a parameter.

Referring to FIG. 6, the API 72 in another scenario prefetches map elements corresponding to physical entities within a radius R of a single point 252. The corresponding geographic area is demarcated by a virtual boundary 254. Similar to FIG. 5, map elements that the API 72 prefetches in this scenario are illustrated with a fill pattern, and map elements that the API 72 does not prefetch are illustrated without a fill pattern.

With reference to FIGS. 5 and 6, it is noted that map data in these examples need not be associated with map tiles at all, neither at the map data provider nor at the portable device. For example, each map element can be positioned on a digital map using global coordinates. On the other hand, if map tiles are used, map elements can be positioned within the corresponding map tiles using local, tile-specific coordinates.

Figure 7:
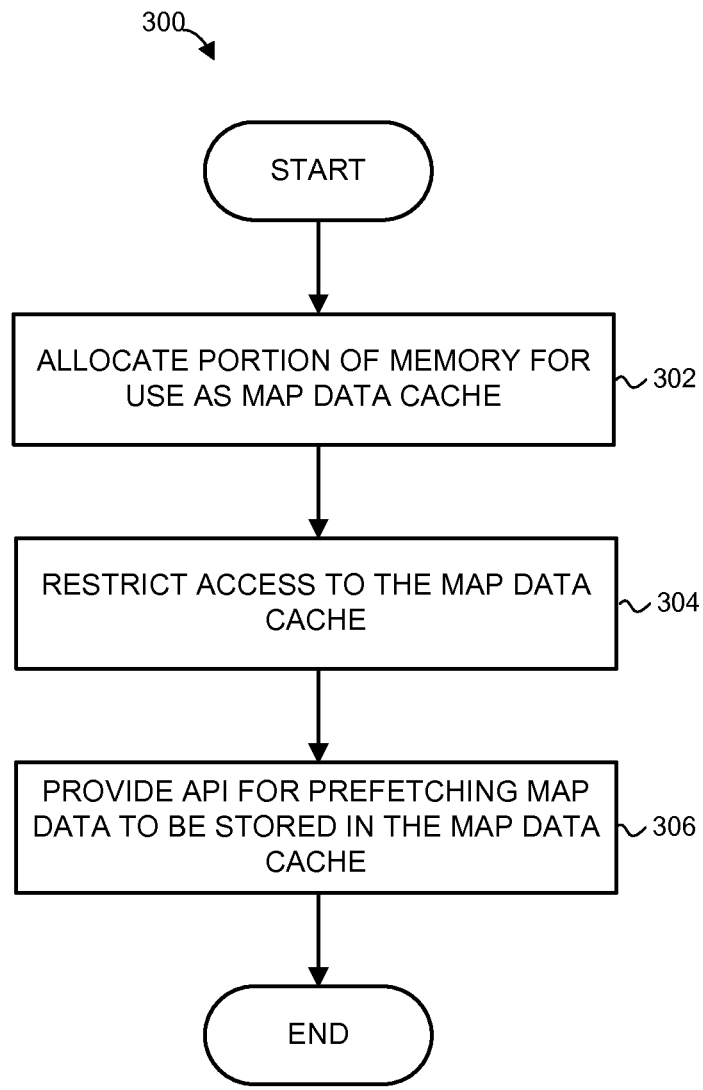
FIG. 7 is a flow diagram of an example method for providing map data prefetching capability to software applications executing on the portable device of FIG. 1.

Now referring to FIG. 7, an example method 700 for providing map data prefetching capability to software applications can be implemented in a computing device such as the portable device 12 or 50, for example. According to one implementation, an operating system that provides an API for prefetching and rendering map data (such as the API 22 or 72) implements the method 700.

At block 302, a portion of a memory is allocated to serve as a map data cache. Next, at block 304, access to the map data cache is restricted so as to prevent software applications, such as the software applications 20 and 74, from accessing the map data cache directly. At block 306, the method 300 includes providing an API for prefetching and rendering map data, to be stored in the map data cache. In an embodiment, the API has read and write permissions for the map data cache allocated at block 302. More generally, the API can operate the map data cache in accordance with the techniques discussed above with reference to FIGS. 1-6.

Figure 8:
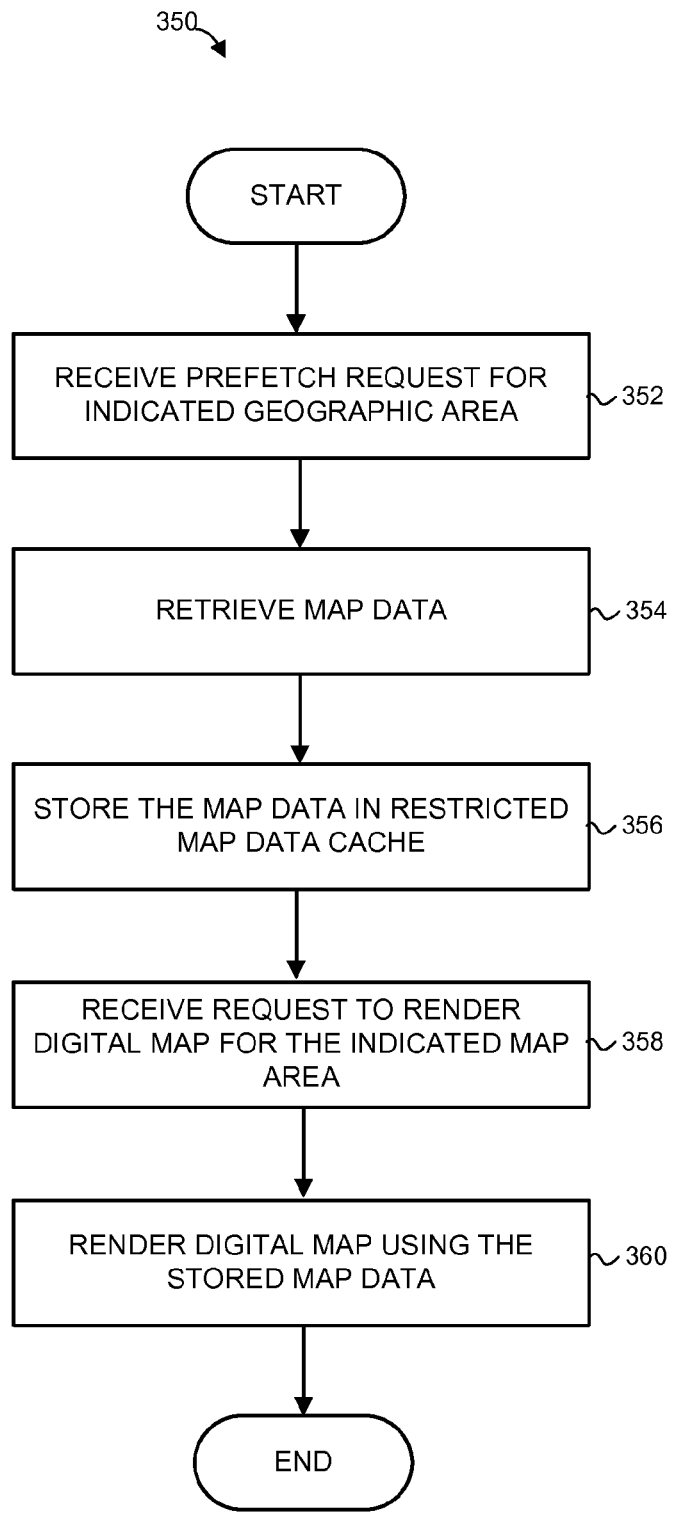
FIG. 8 is a flow diagram of an example method for prefetching map data in the portable device of FIG. 1.

FIG. 8 illustrates an example method 350 which the API 22, the API 72, or a similar API can implement to provide prefetching capability to a software application. The method 350 begins at block 352, at which a prefetch request for an indicated geographic area is received. For example, a software application can invoke the API and directly specify the geographic area using a polyline and a radius. In another implementation, the software application invokes the API and indirectly specifies the geographic area as a source, a destination, and a request to prefetch map data along a route that connects the source to the destination.

Map data then is retrieved from a map data provider at block 354 and stored in the map data cache at block 356. Next, at block 358, a request is received to render a digital map depicting the entire geographic area for which map data was prefetched at block 354. The request at block 358 sometimes may specify only a portion of the geographic area. For example, if map data is retrieved along a polyline (e.g., a driving route from a source city to a destination city), the request at block 358 may indicate a point proximate to the polyline (e.g., a town on this route). At block 360, a digital map is rendered using the map stored in the map data cache without requesting the map data from a map data provider.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an API for prefetching and rendering map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium storing instructions thereon that implement an application programming interface (API) for prefetching map data on a computing device having a processor and a display device, wherein the computing device is configured to communicate with a map data provider via a communication network, and wherein the API, when invoked in a software application executed on the processor, is configured to:

receive a prefetch request for an indicated geographic area from the software application;

in response to the prefetch request: (i) retrieve map data corresponding to the indicated geographic area from the map data provider, and (ii) store the map data in a map data cache without causing a digital map based on the map data to be displayed on the display device, wherein the map data cache is accessible to the software application only via the API;

subsequently to storing the map data in the map data cache, receive a request to render the digital map from the software application; and in response to the request to render the digital map, render the digital map using the map data stored in the map data cache, wherein the digital map is displayed on the display device.

2. The non-transitory computer-readable medium of claim 1, wherein the prefetch request specifies a polyline interconnecting a plurality of geographic locations, and wherein the indicated geographic area is within a fixed radius of the polyline.

3. The non-transitory computer-readable medium of claim 2, wherein the prefetch request further specifies the radius.

4. The non-transitory computer-readable medium of claim 2, wherein the retrieved map data includes a plurality of discrete map elements in a vector graphics format, and wherein the API is configured to retrieve only map elements that represent physical entities at least partially disposed within a fixed radius of the polyline.

5. The non-transitory computer-readable medium of claim 1, wherein the prefetch request indicates a first geographic location and a second geographic location, and wherein the API is configured to retrieve map data for locations disposed within a fixed radius of a route from the first geographic location to the second geographic location.

6. The non-transitory computer-readable medium of claim 1, wherein the prefetch request indicates a single point corresponding to a geographic location; and wherein the map data is retrieved for areas disposed within a fixed radius of the single point.

7. The non-transitory computer-readable medium of claim 1, wherein the prefetch request indicates a shape that encloses the indicated geographic area.

8. The non-transitory computer-readable medium of claim 1, wherein the retrieved map data is in a raster image format.

9. The non-transitory computer-readable medium of claim 1, wherein the API is provided as a function of an operating system (OS) for use by software applications native to the OS.

10. A method for prefetching map data in computing device including a memory, a processor, and a display device, the method comprising:

allocating a portion of the memory for use as a map data cache, wherein the map data cache stores map data received from a map data provider via a communication network, including preventing software applications being executed by the processor from accessing the map data cache; and providing an application programming interface (API) for use by the software applications, including:

in response to the API being invoked for prefetching map data, (i) retrieving map data for an indicated geographic area and (ii) storing the map data in the map data cache, wherein a digital map based on the map data is not displayed on the display device in response to the API being invoked for prefetching the map data, and in response to the API being subsequently invoked for displaying the prefetched map data, (i) retrieving the map data from the map data cache and (ii) generating a digital map using the map data for display on the display device.

11. The method of claim 10, further comprising providing an operating system (OS) for use on a portable computing device, wherein the API is for use by software applications native to the OS.

12. The method of claim 10, wherein:
retrieving the map data in response to the API being invoked for prefetching map data includes receiving the map data via a wireless communication network, and
no wireless network coverage is available when the API being subsequently invoked for displaying the prefetched map data.

13. The method of claim 10, wherein:
retrieving the map data in response to the API being invoked for prefetching map data includes receiving the map data via a first wireless communication network, and
the API being subsequently invoked for displaying the prefetched map data when the computing device roams onto a second wireless communication network.

14. The method of claim 10, wherein the API is configured to receive a description of a polyline interconnecting a plurality of geographic locations, and wherein the indicated geographic area is within a fixed radius of the polyline.

15. The method of claim 14, wherein the retrieved map data is in a vector graphics format and corresponds to a certain zoom level, wherein the digital map is made of a plurality of map tiles of equal size associated with the zoom level, and wherein retrieving the map data for the indicated geographic area includes:
retrieving a first map element that corresponds to a first physical entity disposed within the fixed radius of the polyline, and
not retrieving a second map element that corresponds to a second physical entity disposed outside the fixed radius of the polyline,
wherein the first map element and the second map element are mapped to a same map tile.

16. The method of claim 10, wherein the API is configured to receive a description of a shape that encloses the indicated geographic area.

17. The method of claim 10, wherein the API is configured to receive a description of a single point corresponding to a geographic location; and wherein the map data is retrieved for areas disposed within a fixed radius of the single point.

18. A mobile device configured to communicate via a wireless communication link, the mobile device comprising:
a processor;
a display device;
a network interface communicatively coupled to the wireless communication link;
a memory communicatively coupled to the processor;
a map data cache disposed in the memory, wherein the map data cache is not accessible to software applications executing on the mobile device via read or write operations;
instructions stored in the memory that implement an application programming interface (API) for prefetching map data, wherein the API, when invoked by a software application executing on the mobile device, is configured to:
in response to receiving a prefetch request indicating a geographic area from a software application executing on the mobile device, (i) retrieve map data for the indicated geographic area via the network interface and (ii) store the map data in the map data cache, wherein a digital map based on the map data is not displayed on the display device in response to receiving the prefetch request, and
in response to subsequently receiving a request to render the digital map from the software application, cause the digital map to be displayed on the display device using the map data stored in the map data cache.

19. The mobile device of claim 18, wherein the instructions that implement the API are first instructions, the mobile device further comprising:
second instructions stored in the memory that, when executed on the mobile device, implement an operating system (OS) that provides a plurality of functions invoked by the software applications executing on the mobile device, wherein the plurality of functions include the read and write operations;
wherein the software application that invokes the API for prefetching map data is native to the OS.

20. The mobile device of claim 19, wherein the software application is a web browser application.

21. The mobile device of claim 19, wherein the OS allocates a portion of the memory for use as the map data cache.

22. The mobile device of claim 19, wherein the prefetch request specifies a polyline interconnecting a plurality of geographic locations, and wherein the indicated geographic area is within a fixed radius of the polyline.

23. The mobile device of claim 19, wherein the prefetch request specifies a shape that encloses the indicated geographic area.

* * * * *